US010951365B2

(12) United States Patent
Dudda et al.

(10) Patent No.: US 10,951,365 B2
(45) Date of Patent: Mar. 16, 2021

(54) TECHNIQUE FOR TRANSFERRING DATA IN A RADIO COMMUNICATION

(71) Applicant: Telefonaktiebolaget LM Ericsson (publ), Stockholm (SE)

(72) Inventors: Torsten Dudda, Aachen (DE); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 16/461,462

(22) PCT Filed: Oct. 23, 2017

(86) PCT No.: PCT/EP2017/076971
§ 371 (c)(1),
(2) Date: May 16, 2019

(87) PCT Pub. No.: WO2018/091227
PCT Pub. Date: May 24, 2018

(65) Prior Publication Data
US 2019/0349140 A1    Nov. 14, 2019

Related U.S. Application Data

(60) Provisional application No. 62/424,055, filed on Nov. 18, 2016.

(51) Int. Cl.
*H04W 4/00* (2018.01)
*H04L 1/18* (2006.01)
(Continued)

(52) U.S. Cl.
CPC ............ *H04L 1/189* (2013.01); *H04L 1/0061* (2013.01); *H04L 5/0055* (2013.01); *H04W 76/15* (2018.02); *H04W 80/02* (2013.01); *H04W 80/08* (2013.01)

(58) Field of Classification Search
CPC ..... H04L 1/189; H04L 1/0061; H04L 5/0055; H04W 76/15; H04W 80/02; H04W 80/08
(Continued)

(56) References Cited

U.S. PATENT DOCUMENTS 8,081,619 B2 * 12/2011 Jiang ..................... H04L 1/1832
370/350
8,340,082 B2 * 12/2012 Kawasaki ............... H04J 15/00
370/352
(Continued)

FOREIGN PATENT DOCUMENTS

WO    2012159975 A1    11/2012
WO    2014035906 A1    3/2014
(Continued)

OTHER PUBLICATIONS

LG Electronics Inc., "PDCP ARQ", 3GPP TSG-RAN WG2 Meeting #96, Reno, USA, Nov. 14, 2016, pp. 1-2, R2-168277, 3GPP.
(Continued)

*Primary Examiner* — Thai D Hoang
(74) *Attorney, Agent, or Firm* — Coats + Bennett, PLLC

(57) ABSTRACT

A technique for transferring data on a radio bearer is described. The split radio bearer includes a first layer entity (570) at a first layer of a protocol stack and at least two second layer entities at a second layer of the protocol stack. The second layer is lower than the first layer in the protocol stack. In a method aspect of the technique, the data is received through each of the at least two second layer entities (582, 584). The data received through the at least two second layer entities (582, 584) is validated. If a result of the validation is indicative of an inconsistency in the data received through the at least two second layer entities (582, 584), a retransmission of the data is selectively triggered through at least one of the second layer entities (582, 584).

19 Claims, 8 Drawing Sheets

(51) Int. Cl.
*H04W 76/15* (2018.01)
*H04L 1/00* (2006.01)
*H04L 5/00* (2006.01)
*H04W 80/02* (2009.01)
*H04W 80/08* (2009.01)

(58) Field of Classification Search
USPC ............... 370/329–330, 335–345, 347–348
See application file for complete search history.

(56) References Cited

U.S. PATENT DOCUMENTS

| | | | | |
|---|---|---|---|---|
| 8,385,305 | B1* | 2/2013 | Negus | H04W 72/0453 370/338 |
| 8,467,363 | B2* | 6/2013 | Lea | H04L 25/03828 370/338 |
| 8,983,448 | B2* | 3/2015 | Jang | H04W 72/048 455/420 |
| 10,841,890 | B2* | 11/2020 | Sutton | H04W 56/003 |
| 2008/0170522 | A1 | 7/2008 | Sammour et al. | |
| 2011/0170491 | A1 | 7/2011 | Shinohara et al. | |
| 2011/0286436 | A1* | 11/2011 | Suzuki | H04L 5/0048 370/336 |
| 2012/0039227 | A1 | 2/2012 | Chen et al. | |
| 2012/0093127 | A1* | 4/2012 | Suzuki | H04W 28/18 370/331 |
| 2013/0010709 | A1* | 1/2013 | Earnshaw | H04L 5/0091 370/329 |
| 2013/0176988 | A1* | 7/2013 | Wang | H04L 5/0053 370/331 |
| 2013/0242824 | A1 | 9/2013 | Lee et al. | |
| 2014/0376358 | A1 | 12/2014 | Eder et al. | |
| 2015/0085796 | A1 | 3/2015 | Xu et al. | |
| 2015/0117357 | A1* | 4/2015 | Ozturk | H04W 24/10 370/329 |
| 2015/0237621 | A1* | 8/2015 | Zhu | H04W 72/0426 370/329 |
| 2015/0271746 | A1* | 9/2015 | Jang | H04W 74/0833 370/329 |
| 2015/0271867 | A1* | 9/2015 | Lee | H04W 76/19 370/329 |
| 2015/0296418 | A1* | 10/2015 | Szilagyi | H04L 69/161 370/331 |
| 2015/0333890 | A1 | 11/2015 | Yang et al. | |
| 2016/0014626 | A1 | 1/2016 | Yi et al. | |
| 2020/0107386 | A1* | 4/2020 | Van Phan | H04L 1/08 |
| 2020/0154383 | A1* | 5/2020 | Sutton | H04L 1/1664 |

FOREIGN PATENT DOCUMENTS

| | | |
|---|---|---|
| WO | 2014153125 A1 | 9/2014 |
| WO | 2015067823 A1 | 5/2015 |
| WO | 2018091228 A1 | 5/2018 |

OTHER PUBLICATIONS

Weiner, M. et al., "Design of a Low-Latency, High-Reliability Wireless Communication System for Control Applications", 2014 IEEE International Conference on Communication, Aug. 28, 2014, pp. 1-7, IEEE.

* cited by examiner

US 10,951,365 B2

TECHNIQUE FOR TRANSFERRING DATA IN A RADIO COMMUNICATION

TECHNICAL FIELD

The present disclosure generally relates to a technique for transferring data by means of a radio communication. More specifically, methods and devices are provided for transmitting and receiving data in a radio communication.

BACKGROUND

For some use cases such as Critical Machine-Type Communication (CMTC), the reliability of a data transfer between stations of existing radio communication systems is insufficient. In the wide range of machine communication use cases, CMTC is a subgroup requiring very high reliability and availability. M. Weiner et al. discuss in the article "Design of a Low-Latency, High-Reliability Wireless Communication System for Control Applications" (IEEE ICC 2014, Selected Areas in Communications, pages 3835 to 3841) the reliability for existing radio communication techniques.

In existing radio communication protocols such as 3GPP Long Term Evolution (LTE), the physical (PHY) layer provides, e.g., adaptive coding, modulation and power control as well as multi-antenna processing. For physical channels transmitting user data, a 24-bit Cyclic Redundancy Check (CRC) value is inserted, leading to a residual error of 1E-7.

The Medium Access Control (MAC) layer does multiplexing and scheduling of data from different radio bearers. As the MAC layer is above the PHY layer, the data processed on the MAC layer is also protected by the CRC. Above the MAC layer, the Radio Link Control (RLC) layer provides segmentation and concatenation of data, and if configured, ARQ functionality, i.e., RLC retransmissions. The RLC layer provides in-sequence delivery to higher layers. Since both data and RLC ARQ feedback (i.e., the RLC status report) is transmitted using the 24-bit CRC of the PHY layer, a residual error probability of 1E-7 remains on the RLC layer.

Above the RLC layer, the packet data convergence protocol (PDCP) layer provides header compression to reduce overhead, as well as ciphering of data to be transmitted. The PDCP layer functions as an anchor point for a lossless handover between LTE base stations (i.e., evolved Node Bs or eNBs) by forwarding outstanding data from the source eNB to the target eNB. As no additional scheme for error detection or error correction is implemented on the PDCP layer in typical LTE configurations, the PDCP layer is affected by the same residual error as the RLC layer. The radio resource control (RRC) protocol exchanges control-signaling messages between an eNB and an LTE User Equipment (UE). The RRC protocol and the user plane (e.g., Internet Protocol or IP data) use the same LTE protocol stack. Hence, RRC messages and IP data are sent via the layers PDCP, RLC, MAC and PHY.

While LTE Carrier Aggregation (CA) increases the data rate per UE, CA does not provide higher reliability even if the UE is connected to multiple eNBs. Therefore, existing radio communication systems such as LTE cannot fulfill the reliability requirements of some use cases such as CMTC.

SUMMARY

Accordingly, there is a need for radio communication systems capable of meeting different requirements on reliability in a wide range of use cases.

As to one aspect, a method of receiving data on a radio bearer is provided. The radio bearer includes a first layer entity at a first layer of a protocol stack and at least two second layer entities at a second layer of the protocol stack, wherein the second layer is lower than the first layer in the protocol stack; such radio bearer will also being referred to as split radio bearer in the following.

The method comprises or triggers a step of receiving the data through each of the at least two second layer entities; a step of validating the data received through the at least two second layer entities; and a step of selectively triggering a retransmission of the data through at least one of the second layer entities, if a result of the validation is indicative of an inconsistency in the data received through the at least two second layer entities.

By validating the data received through the at least two second layer entities, the first layer can increase the reliability of the data transfer, e.g., beyond the reliability provided by the second layer. For example, each of the second layer entities may perform an error detection scheme, which provides a reliability that is sufficient for a first use case and insufficient for a second use case. By applying the technique in the second use case, the reliability requirements of the second use case can be fulfilled, e.g., without modification on the second layer of the protocol stack.

Embodiments can use the two or more second layer entities to increase the reliability of the data transfer without increasing the latency of the data transfer.

By validating that consistent data (e.g., the same data) is received through the at least two second layer entities, the reliability of the data transfer can be increased. The received data may be validated for mutual consistency of the data received through each of the second layer entities. For example, if the probability for an erroneous data transfer through each of the second layer entities is P, the reliability conveyed by the split radio bearer can be $1-P^N$ for the data transfer, wherein N is the number of the at least two second layer entities.

The data may be received at a receiving station and/or from a transmitting station of a radio network. The method may be performed by the receiving station. The transmitting station and the receiving station may be in radio communication according to the protocol stack.

Triggering the retransmission of the data through at least one of the second layer entities may be implemented by triggering a retransmission that allows receiving the retransmitted data through the at least one of the second layer entities. Alternatively or in combination, triggering the retransmission of the data through the at least one of the second layer entities may be implemented by sending a control signal (for causing the retransmission) through the at least one of the second layer entities. The retransmission may be triggered by the first layer entity (e.g., by means of a PDCP status report as the control signal) and/or at least one of the second layer entities (e.g., by means of an RLC status report as the control signal).

The first layer entity may validate the data received through the at least two second layer entities. The first layer entity may terminate the split radio bearer. The first layer entity may terminate the protocol stack of the split radio bearer. The first layer entity may be on the highest layer of the protocol stack processing the split radio bearer. The first layer entity may provide the data to a layer higher than the first layer, e.g., depending on the result of the validation.

The first layer may include at least one of a Radio Resource Control (RRC) layer and a Packet Data Convergence Protocol (PDCP) layer. The split radio bearer may be terminated at the RRC layer or the PDCP layer, i.e., the RRC layer or the PDCP layer may be the highest layer of the split radio bearer. The first layer entity may include a PDCP entity.

The second layer may include a Radio Link Control (RLC) layer. Each of the at least two second layer entities may include an RLC entity. The radio bearer may include at least two logical channels. E.g., one of the logical channels may be associated with each of the second layer entities.

The validation may include comparing the data received through each of the second layer entities. The data may be consistent, if the data (or predefined parts thereof) are equal.

The validation may require an error detection scheme performed for the data received through each of the second layer entities. The validation may be performed only if the error detection scheme indicates no error (i.e., a positive result) in the data received through each of the second layer entities.

The validation may increase the reliability by requiring at least one of a positive result for the data received through each of the second layer entities and consistency of the data received through the second layer entities.

The error detection scheme may be performed independently for the data received through each of the second layer entities. The error detection scheme may be a Cyclic Redundancy Check (CRC). The data received through each of the second layer entities may be protected by a CRC value. The error detection scheme may use a CRC value transmitted in association with the data. E.g., a transport block may include the data and the CRC value. Alternatively or in addition, the error detection scheme may use sequence numbers transmitted in association with PDUs carrying the data for detecting a missing PDU as the error.

The error detection scheme may be performed by the second layer entities or on a layer lower than the second layer, e.g., on a physical (PHY) layer or a Medium Access Control (MAC) layer. A result of the error detection scheme may be reported to the first layer entity. The result of the error detection scheme may be implicitly reported to the first layer entity by providing the data to the first layer entity only if the result of the error detection scheme indicates no error.

An acknowledgment (ACK) may be sent for the received data, if a result of the error detection scheme is indicative of no error for the data received through each of the second layer entities and if the result of the validation is indicative of consistency of the received data. The first layer entity may send the ACK (e.g., according to the first layer of the protocol stack). Alternatively or in combination, the corresponding second layer entity may send the ACK (e.g., according to the second layer of the protocol stack).

At least two of the second layer entities may receive the data in a dual connectivity or multi connectivity. The receiving station may be in dual connectivity (DC) or multi connectivity with two or more transmitting stations.

The first layer entity may trigger the retransmission by sending a negative acknowledgment (NACK) for the received data in a status report. The status report may be sent according to the first layer of the protocol stack. The status report may be sent to a peer entity of the first layer, e.g., a first layer entity at the transmitting station. For example, triggering the retransmission may include sending a feedback (e.g., a PDCP status report) from the PDCP entity of the receiving protocol stack to a peer PDCP entity of a sending protocol stack for triggering the retransmission.

Alternatively or in addition, the first layer entity may inform the at least one of the second layer entities as to the result of the validation. The information may be sent (e.g., in a control signal) from the first layer entity of the protocol stack (e.g., at the receiving station) to the at least one of the second layer entities (e.g., at the receiving station). Alternatively or in addition, the second layer entities may check (e.g., periodically) whether the first layer entity has validated the data. The control signal or the check may be indicative of the consistency or the inconsistency in the received data.

The at least one second layer entity may trigger the retransmission by sending a NACK for the received data in a status report. One or each of the second layer entities may send the status report responsive to the first layer entity informing that the validation result is indicative of an inconsistency.

The status report may be sent according to the second layer of the protocol stack. The status report may be sent to a peer entity of the second layer. Each of the second layer entities may send a feedback to a peer second layer entity of a transmitting protocol stack (e.g., at the transmitting station) for triggering the retransmission. For example, an RLC status report may include the feedback to the peer RLC entity.

The second layer entities may refrain from (e.g., delay) sending the ACK for the respectively received data until the result of the validation is indicative of consistency of the received data. The second layer entity may refrain from sending the ACK for the received data after the error detection scheme (e.g., the CRC) is positive (i.e., indicates no error) for the data received through the corresponding second layer entity.

The second layer entities may send a feedback indicative of an outstanding validation of the respectively received data before the result of the validation is indicative of consistency of the received data. The second layer entities may send the feedback indicative of the outstanding validation after the error detection scheme (e.g., the CRC) is positive (i.e., indicates no error) for the data received through the corresponding second layer entity and before the result of the validation is indicative of consistency of the received data.

The technique can be implemented using an existing communication protocol, e.g., an existing split radio bearer. A mobile communication system implementing the technique can be backward compatible by selectively using the split radio bearer without duplicating or multiplying the data at the transmitting station and/or without comparing data at the receiving station. Alternatively or in addition, embodiments may adapt the number of second layer entities for the split radio bearer, e.g., to fulfill different requirements on reliability and/or redundancy for a wide range of use cases.

The protocol stack may include at least one of a physical layer (PHY layer), a Medium Access Control (MAC) layer and a Radio Link Control (RLC) layer. The method may be implemented (e.g., partly or completely) on the PHY layer, the MAC layer and/or the RLC layer. For example, the error detection scheme may be performed on the PHY layer and/or the MAC layer based on a Cyclic Redundancy Check (CRC) value protecting a Protocol Data Unit (PDU) including (e.g., partly or completely) the data. The multiplication of the data to be transmitted and/or the validation of the received data may be performed by one PDCP entity for all of the RLC entities or logical channels.

The data may be received in the radio communication of a radio network, e.g., a cellular network. The radio network may include a Radio Access Network (RAN), e.g., according to 3GPP Long Term Evolution (LTE) or 3GPP New Radio (NR). A station of the radio network may receive the data. The method may be performed or triggered by the receiving station of the radio network. The data may be received from and/or the feedback may be sent to a transmitting station of the radio network.

The transmitting station or the receiving station may be a base station or a mobile station (also referred to as wireless device). The data may be received at a receiving base station or a receiving wireless device from a transmitting base station or a transmitting wireless device. The radio communication may include a downlink from the transmitting base station to the receiving wireless device. Alternatively or in addition, the radio communication may include an uplink from the transmitting wireless device to the receiving base station. Alternatively or in addition, the radio communication may include a sidelink from the transmitting wireless device to the receiving wireless device. Alternatively or in addition, the radio communication may include a backhaul link from the transmitting base station to the receiving base station.

The base station may provide radio access, e.g., in a cell of the radio network. The base station may be an evolved Node B (eNB) according to LTE or an Access Point (AP) according to Wi-Fi (also referred to as WLAN node).

The wireless device may comprise a user interface or may be an embedded system (e.g., without a user interface). The wireless device may be a User Equipment (UE), a smartphone or a wearable device. The data may be received in a Machine-Type Communication (MTC). The wireless device may be a device for MTC. The wireless device may include a sensor and/or an actuator. The wireless device may operate (e.g., move) autonomously. The wireless device may be an industrial robot or a road vehicle.

The radio communication may be a MTC. The technique can be implemented for Critical MTC (CMTC), e.g. due to the increased reliability of the data transfer. The technique may be selectively applied depending on a current the use case. The technique can be implemented for time-critical MTC. E.g., the split bearer data transfer can increase reliability without increasing latency.

As to another aspect, a method of transmitting data on (or via) a split radio bearer is provided. The split radio bearer includes a first layer entity at a first layer of a protocol stack and at least two second layer entities at a second layer of the protocol stack. The second layer is lower than the first layer in the protocol stack. The method comprises or triggers a step of transmitting the data through each of the at least two second layer entities; a step of receiving a feedback indicative of a result of validating the data transmitted through the at least two second layer entities; and a step of selectively retransmitting the data through at least one of the second layer entities, if the result of the validation is indicative of an inconsistency for the data transmitted through the at least two second layer entities.

A station of a radio network may transmit the data. The method may be performed or triggered by the transmitting station of the radio network. The data may be transmitted to and/or the feedback may be received from a receiving station of the radio network.

The first layer entity may duplicate or multiply a packet data unit (PDU, e.g., a PDCP PDU) including the data to be transmitted. To each of the at least two second layer entities, one of the different copies or different versions of the PDUs may be provided for the transmission.

The feedback may be indicative of a result of comparing the data received through each of the second layer entities. The feedback may depend on a result of an error detection scheme performed for the data transmitted through each of the second layer entities.

The feedback may include an ACK for the transmitted data, if the result of the error detection scheme is indicative of no error for the data transmitted through each of the second layer entities and if the result of the validation is indicative of consistency for the transmitted data. The second layer entities may receive the feedback indicative of the ACK for the respectively transmitted data delayed and/or asynchronously relative to each other.

The method may further comprise any feature disclosed in the context of the one method aspect and/or one or more steps corresponding to any of the steps of the one method aspect.

According to a further aspect, a control signal indicative of a configuration for a station configured for receiving data in a radio communication is provided. The configuration causes the station to perform any one of the steps of the one method aspect.

According to a still further aspect, a control signal indicative of a configuration for a station configured for transmitting data in a radio communication is provided. The configuration causes the station to perform any one of the steps of the other method aspect.

The control signal may be sent to or received from, or a control signaling structure for the control signal may be implemented on, at least one of an RRC layer, an RLC layer and a MAC layer of the protocol stack.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the radio network and/or the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for receiving data on a split radio bearer that includes a first layer entity at a first layer of a protocol stack and at least two second layer entities at a second layer of the protocol stack is provided. The second layer is lower than the first layer in the protocol stack. The device may be configured to perform or trigger the one method aspect. Alternatively or in addition, the device comprises a receiving unit configured to receive the data through each of the at least two second layer entities; a validating unit configured to validate the data received through the at least two second layer entities; and a triggering unit configured to selectively trigger a retransmission of the data through at least one of the second layer entities, if a result of the validation is indicative of an inconsistency in the data received through the at least two second layer entities.

As to another device aspect, a device for transmitting data on a split radio bearer that includes a first layer entity at a first layer of a protocol stack and at least two second layer entities at a second layer of the protocol stack is provided. The second layer is lower than the first layer in the protocol stack. The device may be configured to perform or trigger the other method aspect. Alternatively or in addition, the device comprises a transmitting unit configured to transmit the data through each of the at least two second layer entities; a receiving unit configured to receive a feedback indicative of a result of validating the data transmitted through the at least two second layer entities; and a retransmitting unit configured to selectively retransmit the data through at least one of the second layer entities, if the result of the validation is indicative of an inconsistency for the data transmitted through the at least two second layer entities.

As to a further device aspect, a device for receiving data on a split radio bearer that includes a first layer entity at a first layer of a protocol stack and at least two second layer entities at a second layer of the protocol stack is provided, wherein the second layer is lower than the first layer in the protocol stack. The device comprises a processor and a memory, said memory containing instructions executable by said processor whereby the device is operative to receive the data through each of the at least two second layer entities; to validate the data received through the at least two second layer entities; and to selectively trigger a retransmission of the data through at least one of the second layer entities, if a result of the validation is indicative of an inconsistency in the data received through the at least two second layer entities.

As to a further device aspect, a device for transmitting data on a split radio bearer that includes a first layer entity at a first layer of a protocol stack and at least two second layer entities at a second layer of the protocol stack is provided, wherein the second layer is lower than the first layer in the protocol stack. The device comprises a processor and a memory, said memory containing instructions executable by said processor whereby the device is operative to transmit the data through each of the at least two second layer entities; to receive a feedback indicative of a result of validating the data transmitted through the at least two second layer entities; and to selectively retransmit the data through at least one of the second layer entities, if the result of the validation is indicative of an inconsistency for the data transmitted through the at least two second layer entities.

As to a further aspect, a station configured for receiving data on a split radio bearer that includes a first layer entity at a first layer of a protocol stack and at least two second layer entities at a second layer of the protocol stack is provided, wherein the second layer is lower than the first layer in the protocol stack. The station may comprise the device according to the one device aspect or may be configured to perform or trigger the one method aspect. Alternatively or in addition, the station comprises a reception module for receiving the data through each of the at least two second layer entities; a validation module for validating the data received through the at least two second layer entities; and a trigger module for selectively triggering a retransmission of the data through at least one of the second layer entities, if a result of the validation is indicative of an inconsistency in the data received through the at least two second layer entities.

As to a further aspect, a station configured for transmitting data on a split radio bearer that includes a first layer entity at a first layer of a protocol stack and at least two second layer entities at a second layer of the protocol stack is provided, wherein the second layer is lower than the first layer in the protocol stack. The station may comprise the device according to the other device aspect or may be configured to perform or trigger the other method aspect. Alternatively or in addition, the station comprises a transmission module for transmitting the data through each of the at least two second layer entities; a feedback module for receiving a feedback indicative of a result of validating the data transmitted through the at least two second layer entities; and a retransmission module for selectively retransmitting the data through at least one of the second layer entities, if the result of the validation is indicative of an inconsistency for the data transmitted through the at least two second layer entities.

The devices and/or the stations may further include any feature disclosed in the context of the method aspects. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP Long Term Evolution (LTE) or a successor thereof, Wireless Local Area Network (WLAN) according to the standard family IEEE 802.11 and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
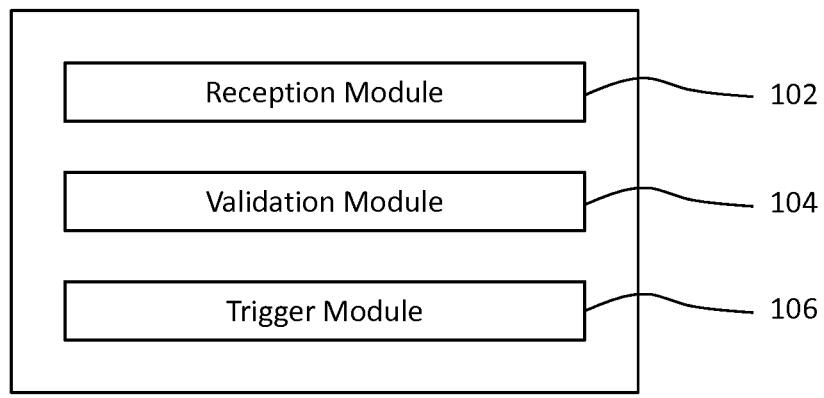
FIG. 1 shows a schematic block diagram of a device embodiment for receiving data on a split radio bearer.

FIG. 1 schematically illustrates a block diagram of a device 100 for receiving data in a radio communication involving a transmitting station and a receiving station. The device 100 may be implemented at the receiving station of the radio communication.

The radio communication uses a split radio bearer. The split radio bearer includes one first layer entity at a first layer of a protocol stack. For example, the first layer entity implements the split radio bearer at the first layer. The first layer entity may provide functionality for the split bearer according to the first layer of the protocol stack.

At a second layer of the protocol stack, which is lower than the first layer, the split radio bearer includes at least two second layer entities. Herein, "lower" may mean closer to a demodulator in a processing chain of the receiving station. Alternatively or in addition, "lower" may mean that a data unit, which includes the received data, further includes more header fields.

For example, the split radio bearer is implemented at the second layer by the at least two second layer entities. Each of the at least two second layer entities may provide functionality for the split bearer according to the second layer of the protocol stack.

The device 100 comprises a reception module 102 for receiving the data through each of the at least two second layer entities of the split radio bearer. For example, the reception module 102 includes or controls the second layer of the protocol stack or the at least two second layer entities thereof. Each of the at least two second layer entities receives the data. For example, different second layer entities receive the data on different logical channels.

The device 100 further comprises a validation module 104 for validating the data received through the at least two second layer entities. A triggering module 106 of the device 100 selectively triggers a retransmission of the data depending on a result of the validation. The result of the validation may be indicative of an inconsistency in the data received through the at least two second layer entities.

The data received through at least one of the second layer entities may be retransmitted. Preferably, the retransmission of the data is received through the corresponding one of the second layer entities through which the data was previously or initially received.

Figure 2:
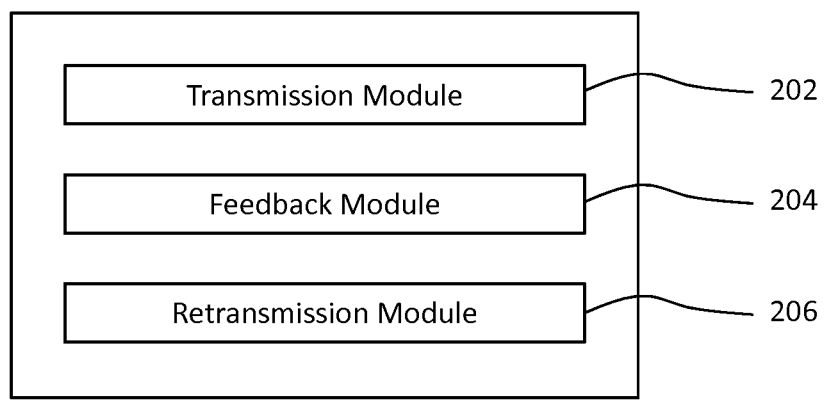
FIG. 2 shows a schematic block diagram of a device embodiment for transmitting data on a split radio bearer.

FIG. 2 schematically illustrates a block diagram of a device 200 for transmitting data in a radio communication involving a transmitting station and a receiving station. The device 200 may be implemented at the transmitting station of the radio communication.

The radio communication uses a split radio bearer. The split radio bearer includes one first layer entity at a first layer of a protocol stack and at least two second layer entities at a lower second layer of the protocol stack, e.g., as described for the device 100.

The device 200 comprises a transmission module 202 for transmitting the data through each of the at least two second layer entities; a feedback module 204 for receiving a feedback indicative of a result of validating the data transmitted through the at least two second layer entities; and a retransmission module 206 for selectively retransmitting the data through at least one of the second layer entities depending on the result. At least one of the modules 202, 204 and 206 may be implemented at the first layer and/or the second layer.

Figure 3:
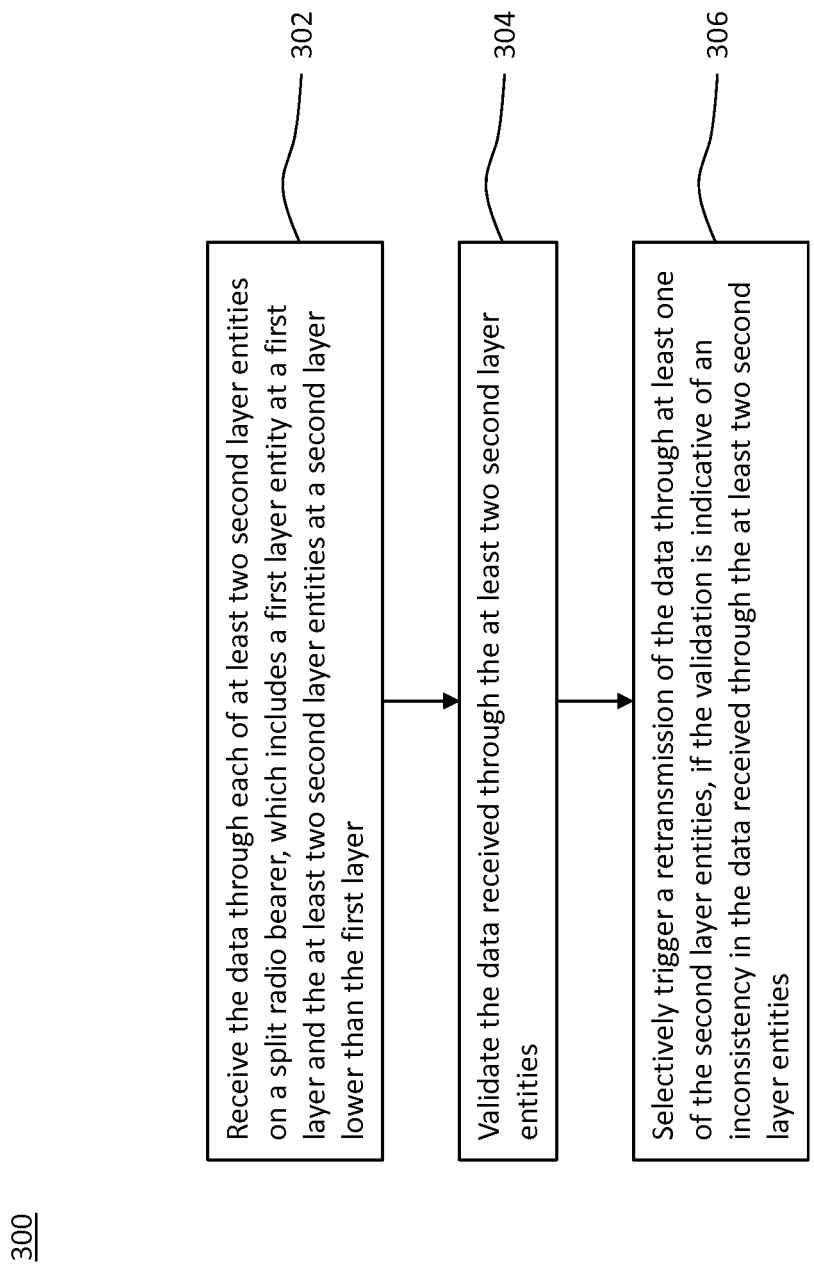
FIG. 3 shows a flowchart of a method embodiment for receiving data on a split radio bearer, which is implementable by the device of FIG. 1.

FIG. 3 shows a flowchart for a method 300 of receiving data in a radio communication. The method 300 comprises or triggers a step 302 of receiving data on a split radio bearer that includes a first layer entity at a first layer of a receiving protocol stack and at least two second layer entities at a second layer of the receiving protocol stack. The second layer is lower than the first layer in the receiving protocol stack. The data is received through each of the at least two second layer entities. In a step 304, the data received through the at least two second layer entities is validated, e.g., compared with each other. If a result of the validation is indicative of an inconsistency in the data received through the at least two second layer entities, a retransmission of the data through at least one of the second layer entities is selectively triggered in a step 306 of the method 300.

The method 300 may be performed by the device 100, e.g., at the receiving station of the radio communication. For example, the modules 102, 104 and 106 may perform the steps 302, 304 and 306, respectively.

Figure 4:
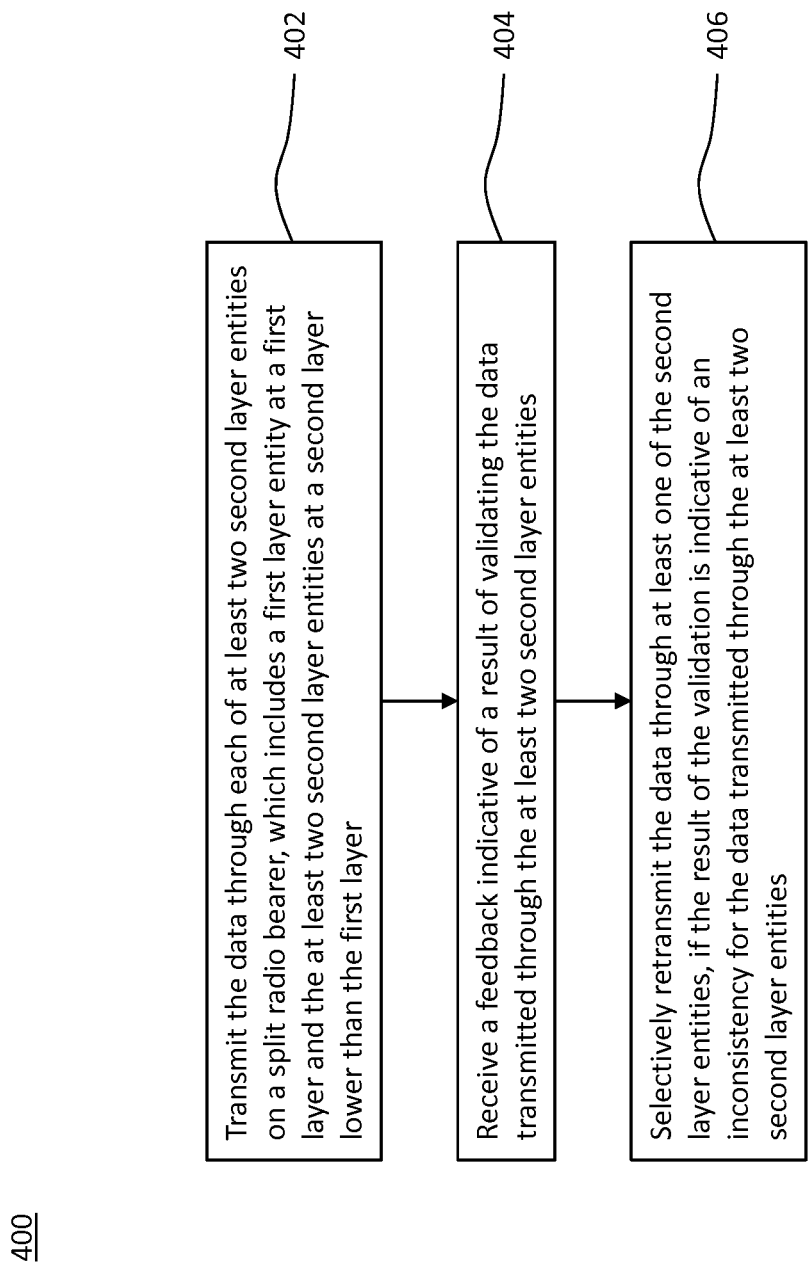
FIG. 4 shows a flowchart of a method embodiment for transmitting data on a split radio bearer, which is implementable by the device of FIG. 2.

FIG. 4 shows a flowchart for a method 400 of transmitting data in a radio communication. The method 400 comprises or triggers a step 402 of transmitting data on a split radio bearer that includes a first layer entity at a first layer of a transmitting protocol stack and at least two second layer entities at a second layer of the transmitting protocol stack. The second layer is lower than the first layer in the transmitting protocol stack. The data is transmitted through each of the at least two second layer entities in a step 402. A feedback indicative of a result of validating the data transmitted through the at least two second layer entities is received in a step 404 of the method 400. If the result of the validation is indicative of an inconsistency for the data transmitted through the at least two second layer entities, the data is selectively retransmitted through at least one of the second layer entities in a step 406 of the method 400.

The feedback may be explicitly or implicitly indicative of the result. The result indicated in the feedback may further depend on a result of an error detection scheme, e.g., a CRC. The result of the validation and the result of the error detection scheme may be logically combined in feedback. For example, the result indicated in the feedback may be positive if the results of both validation and error detection scheme at the receiving station are positive.

The method 400 may be performed by the device 200, e.g., at the transmitting station. For example, the modules 202, 204 and 206 may perform the steps 402, 404 and 406, respectively.

Each of the transmitting and receiving stations may be configured to provide radio access, to access the radio network and/or to wirelessly connect to each other. The radio network includes a Radio Access Network (RAN). For clarity, and without limitation, the technique is described within the context of LTE, i.e. the RAN includes an evolved UMTS Terrestrial Radio Access (E-UTRA) network with at least one eNB as the base station. LTE is used as an example technology that is particularly useful for understanding the technique and its advantages. The skilled person appreciates that problems and solutions described herein are equally applicable to RANs and User Equipments (UEs) implementing other radio access technologies and standards.

The operation of a split radio bearer according to the technique can improve reliability of LTE, e.g., for CMTC use cases. Redundant data transfer on a split radio bearer can improve the reliability without increasing latency. The residual error of accepting data corrupted in the transfer from the transmitting station to the receiving station can be reduced, e.g., exponentially reduced, with the number of second layer entities. The technique can be implemented by coupling multiple second layer entities or logical channels, thus further enhancing the reliability. For simplicity, the technique is explained using two coupled second layer entities or logical channels.

The method 300 or the method 400 may further include a step of configuring the corresponding device 100 or 200 and/or sending a corresponding control signal for configuring the respective other device 200 or 100 for the technique, i.e., for ultra-high reliability (e.g. exceeding the typical reliability level provided by CRC) and/or low latency of a radio bearer (motivating duplicated transmission for reliable low latency communication).

The step 402 may include a substep of duplicating a Packet Data Unit (PDU) of the first layer that is to be transmitted. When receiving PDUs on the first layer in the step 302, the first layer entity validates the transmission success by comparing the received duplicated PDUs. The first layer may trigger the retransmission according to the step 306, if validation not successful. Alternatively or in addition, the first layer may indicate the outcome of the validation to the second layer, i.e., the at least one second layer entity triggering the retransmission according to the step 306. The second layer entities may trigger the retransmission, if the validation was not successful, and/or the second layer entities may refrain from confirming transmission success until successful validation has been achieved by the first layer entity.

Figure 5:
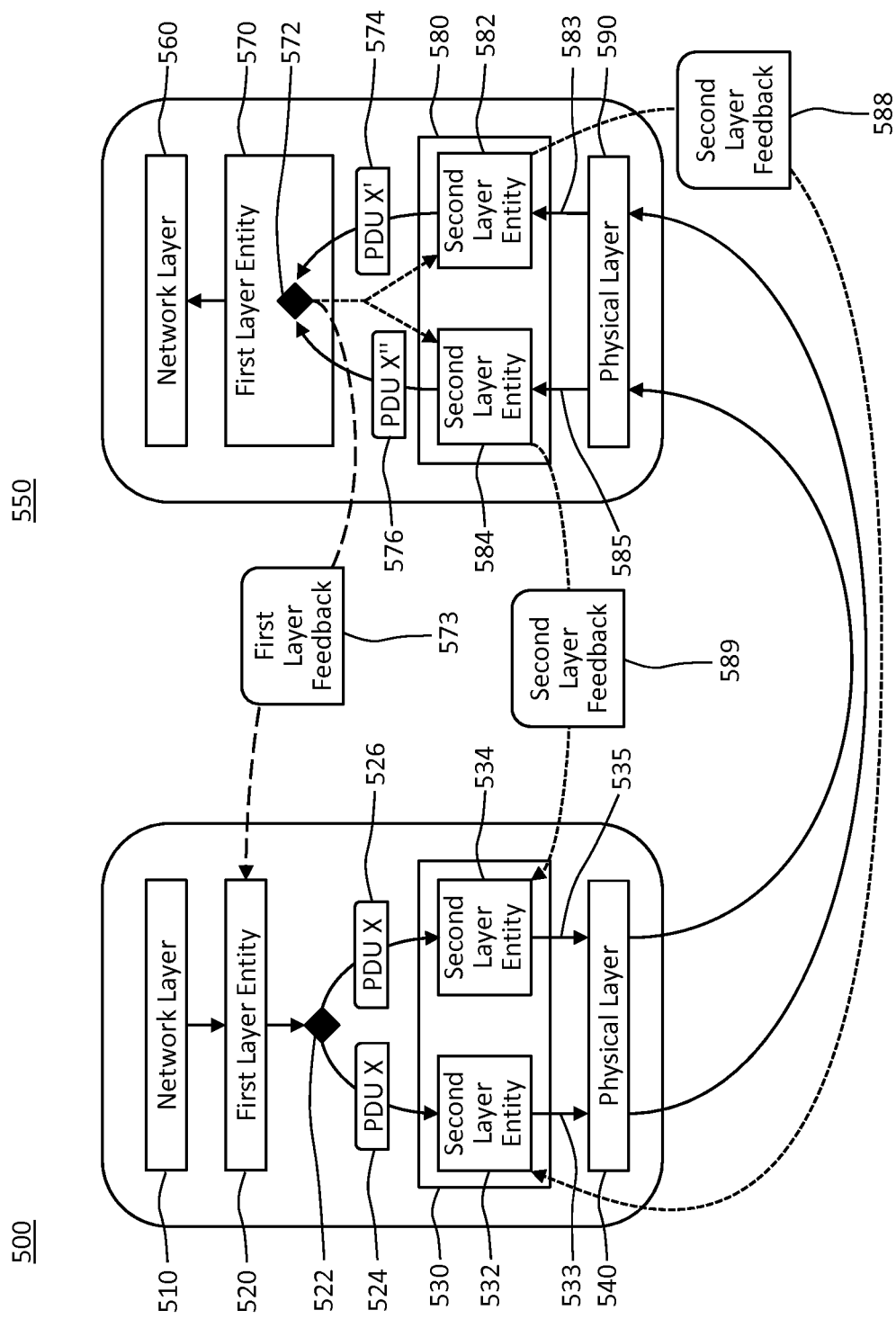
FIG. 5 shows a schematic protocol stack for a first implementation of the methods of FIGS. 3 and 4.

FIG. 5 schematically illustrates transmitting and receiving protocol stacks at the transmitting station 500 and the receiving station 550 for a first implementation of the devices 200 and 100, respectively. The data to be transmitted may be provided by a network layer 510 of the transmitting station. The data may include user data or control data.

A radio bearer is configured for transmission with high reliability, e.g., exceeding $1\text{-}10^{-7}$, according to the method 400. With this configuration, the transmitting station 500 copies the PDUs of the first layer to be transmitted in a substep 522 of the step 402.

At least the data carried by each of the resulting PDUs 524 and 526 is identical. Each PDU of the first layer may include a sequence number (SN). In the example of duplicating the PDUs in the substep 522, both PDUs 524 and 526 have the same SN.

On the second layer 530, the PDUs 524 and 526 are processed by different second layer entities 532 and 534, respectively. On the physical layer 540, the corresponding logical channels 533 and 535 for the PDUs 524 and 526 may be allocated to different radio resources, e.g. in the time domain, frequency domain and/or spatial domain.

In the step 302, the receiving base station 550 receives corresponding PDUs 574 and 576 via its physical layer 590, logical channels 583 and 585, second layer entities 582 and 584 on the second layer 580, respectively. The received PDUs 574 and 576 are delivered from the second layer entities 582 and 584, respectively, to the same first layer entity 570.

The physical layer 590 or the second layer 580 may perform an error detection scheme, e.g., based on a CRC value in a transport block. Due to the reliability limitations of a fixed-length CRC, the second layer entities 582 and 584 may have falsely accepted one of the PDUs 582 and 584 as successfully received, e.g. when bit errors led to another valid CRC value. For example, the duplicated PDUs 524 and 526 with data X may have been altered and include bit-errors upon reception via the second layer entities 582 and 584 at the receiving station 550. That is, one of the received PDUs 574 and 576 may have been altered, or even both received PDUs 574 and 576 may have been differently altered.

The transmitted PDU X at reference sign 524 may have been altered to the received PDU X' (shown at reference sign 574) transmitted and received through the second layer entities 532 and 582, respectively. The transmitted PDU X at reference sign 526 may have been altered to the received PDU X" (shown at reference sign 576) transmitted and received through the second layer entities 534 and 584, respectively.

Furthermore, the PDUs 574 and 576 may be received at different points in time, e.g., due to different transmission times on for the processing paths associated with the different logical channels 533-583 and 535-585 to the receiving station 550. For example, PDUs on the logical channels 533 and 535 may be independently scheduled in the step 402. Also in the step 406, the different logical channels may be allocated to different retransmission times.

The first layer entity 570 identifies the received PDUs 574 and 576 by their attached SN. In the example of PDU duplication, both PDU X' and PDU X" have the same sequence SN. In a substep 572 of the step 304, the receiving first layer entity 572 compares the two PDUs X' and X" (of the same SN). For example, a bit-wise comparison of the entire PDU is performed for the received PDUs 574 and 576.

In case the PDUs 574 and 576 are equal, the data transfer is regarded as successful and the content of the PDU (i.e., the content of any one of the PDUs 574 and 576) is delivered to higher layers, e.g., the network layer 560.

In case the comparing step 572 yields that the PDUs 574 and 576 are not equal, the data transfer is regarded as unsuccessful, i.e. one of the delivering second layer entities 582 and 584 must have falsely accepted its PDU as successfully received, even though at least one bit of the PDU had been altered on the transmission path.

In a first feedback implementation, in case the received PDUs 574 and 576 are not equal, the first layer entity 570 of the receiving protocol stack sends a feedback 573 that is indicative of the failed reception to the peer first layer entity 520 of the transmitting protocol stack. Based on the first layer feedback 573 received in the step 404, a first layer retransmission of the data is initiated, i.e., triggered according to the step 306 and performed according to the step 406. The first feedback implementation is illustrated by long-dashed lines in FIG. 5.

In an LTE implementation, i.e., the first layer including an LTE PDCP layer, the first layer feedback 573 may be provided within a PDCP status report, within an LTE WLAN Aggregation (LWA) status report or any other PDCP control PDU to the transmitting station 500.

In a second feedback implementation, second layer retransmissions are triggered within one of the two or both second layer entities 582 and 584 by the first layer entity 570. The first layer entity 570 informs the corresponding one of the second layer entities 582 and 584, which sends its feedback 588 and 589, respectively, including the NACK. This feedback implementation is illustrated by short-dashed lines in FIG. 5.

The first and second feedback implementations are compatible. For example, the first and second feedback implementations are combined to increase the reliability of the feedback.

In an LTE implementation, the eNB as one of the stations 500 or 550 may configure which of the second layer entities, e.g., which of the RLC entities, are used for PDCP triggered RLC retransmissions.

In a first variant, which is compatible with any embodiment and implementation, the second layer entities is configured to delay the transmission of a status report 588 or 589 indicating successful delivery of the data until the first layer entity 570 informs upon a successful validation. Optionally, each of the second layer entities 582 and 584 does not purge its receiver buffer of seemingly successfully received data to the first layer entity 570 until the first layer entity 570 has successfully validated the PDUs 574 and 575 in the substep 572.

In the example of an LTE downlink data transfer, the receiving PDCP entity 570 in the UE 550 would indicate the validation 572 of successful delivery to one or both receiving RLC entities 582 and 584 in the UE 550.

Due to the fact that reception of the duplicate PDCP PDUs is un-synchronized between the second layer entities 582 and 584, and validation 572 at the first layer entity 570 can be performed only after the corresponding PDUs from both RLCs are received, the first variant can lead to slow second layer status reporting.

In a second variant, which is compatible with any embodiment and implementation, the delay is avoided by means of a dedicated second layer status reporting feedback 588 or 589. In the second variant, each of the second layer entities 582 and 584 does not purge its receiver buffer of seemingly successfully delivered data to the first layer entity 570 until being informed about the successful validation 572 of said data.

To this end, the dedicated second layer status report 588 or 589 indicative of the successful CRC (and not indicative of a result of the validation 572) is sent already before the first layer entity 570 informed the second layer entity 582 or 584 as to the validation result. The dedicated second layer status report may indicate that the received data is "ToBeValidated" for such received PDUs not yet validated by the first layer entity 570. For other PDUs, the second layer feedback 588 or 589 is indicative of the ACK or the NACK, e.g., compatible with legacy behavior.

Optionally, an indication is included in the second layer status reporting feedback 588 or 589 to indicate that the second layer entity 532 or 534 at the transmitting station 500 shall wait with moving a transmission window, e.g., an RLC windows, beyond un-validated PDUs, so that second layer retransmission of those PDUs can happen at a later stage.

In a third variant, which is compatible with any embodiment and implementation, whenever the second layer status reporting feedback 588 or 589 is sent from the second layer entity 582 or 584 at the receiving station 550 to the second layer entity 532 or 535 at the transmitting station 500 (e.g., based on a configured periodicity or based on a polling bit included in a received second layer PDU, e.g., an RLC PDU), the un-validated PDUs (i.e., the first layer PDUs) 574 and 576 delivered by the second layer 580 are regarded as NACK, i.e. not received correctly. To employ this behavior efficiently, i.e., to avoid too many unnecessary retransmissions, a longer period of the second layer status reporting may be configured. In an LTE implementation, the eNB may at least send one of the configuration to the UE and/or reduce a frequency for inserting polling bits in RLC PDUs.

The technique may be implemented or controlled by the first layer entity, e.g., a Packet Data Convergence Protocol (PDCP) entity at the respective stations 500 and 550. Each of the transmitting station 500 and the receiving station 550 may include a base station or a mobile station (or wireless device) of the radio network.

While the technique has been described for a bearer being split into two second layer connections, e.g., two logical channel 533-583 and 535-585 or two RLC connections, the technique is readily extendable to a bearer split into more than two RLC connections.

The different logical channels 533 and 583 as well as 535 and 585 may be implemented using different radio frequency resources, scheduling radio resources at different transmission times and/or using different spatial streams. For example, the different logical channels may be allocated to different carries for the data transmission. 3GPP Release 10 introduced LTE Carrier Aggregation (CA) for exchanging data between UE and eNB on multiple carriers. The technique can be implemented as an extension of CA by allocating the second layer entities (e.g., RLC entities and their logical channels) to the different carriers. By way of example, the CA implementation (at each of the stations 500 and 550) may run in parallel multiple HARQ entities on a MAC layer using multiple transport channels on the physical layer 540 per UE-eNB communication.

Figure 6:
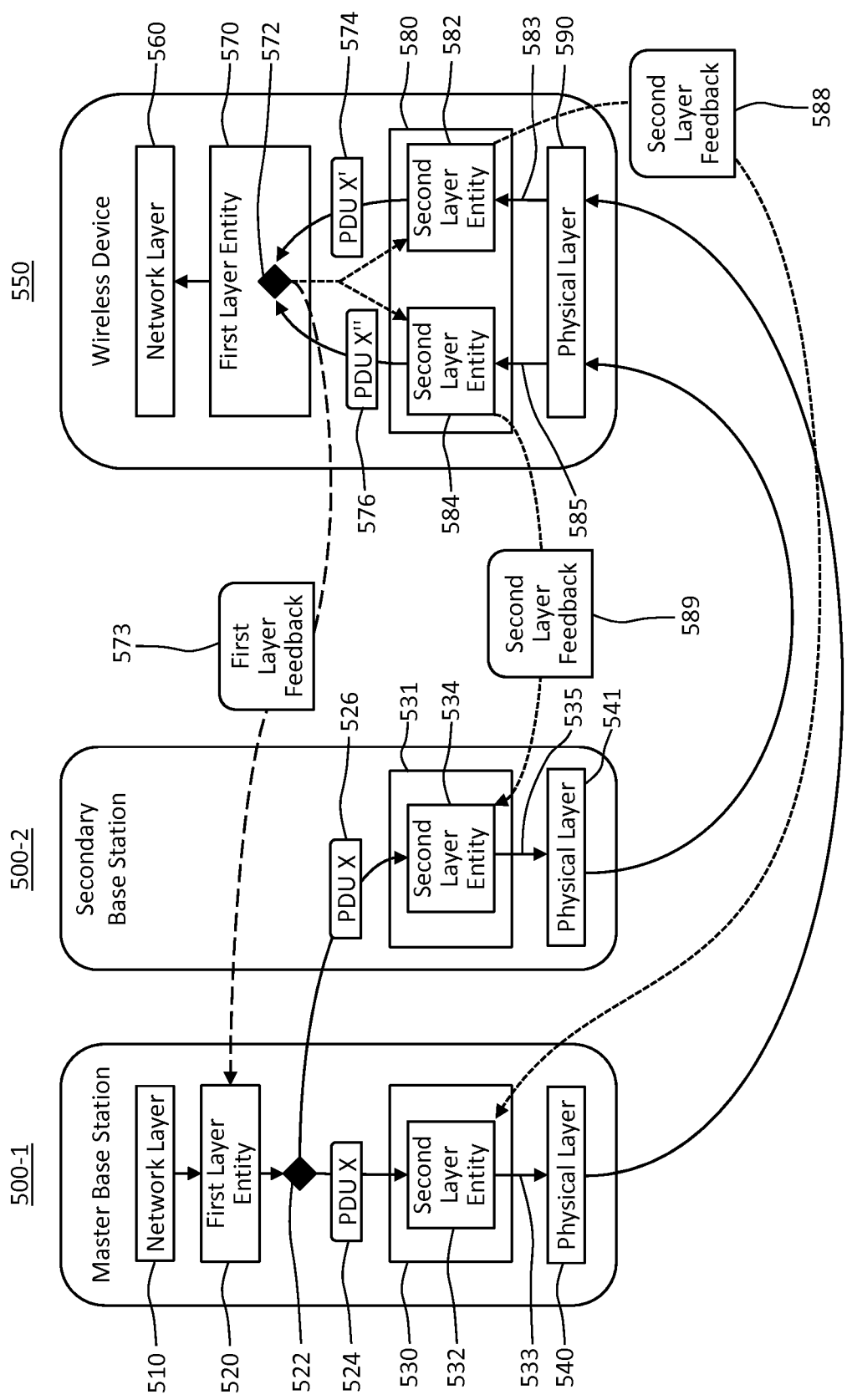
FIG. 6 shows a schematic protocol stack for a second implementation of the methods of FIGS. 3 and 4.

FIG. 6 schematically illustrates transmitting and receiving protocol stacks at the transmitting station 500 and the receiving station 550 for a second implementation of the devices 200 and 100, respectively. The second implementation is compatible with the first implementation, wherein corresponding or interchangeable features are indicated by like reference signs.

In the second implementation, the receiving station 550 is configured for dual connectivity with two or more base stations 500-1 and 500-2 collectively implementing the transmitting protocol stack. The base stations 500-1 and 500-2 may be spaced apart. The receiving station 550 may be located in an overlapping coverage area of the base stations 500-1 and 500-2.

One of the base stations acts as a master base station 500-1, at which the data to be transmitted is received, e.g., from a core network of the radio network. Only the master base station includes the first layer 520 and duplicates in the substep 522 the PDUs of the master base station when transmitting in the step 402.

The equal PDUs 524 and 526 are transmitted by the master base station 500-1 and the base station 500-2 acting as the secondary base station, respectively. The PDU 524 is transmitted in the step 402 via the second layer 530 on the logical channel 533 and the physical layer 540 of the master base station 500-1 to the wireless device 550. The PDU 526 is forwarded to the secondary base station 500-2 (e.g., from the first layer entity 520 to the second layer 531), so that the PDU 526 is transmitted in the step 402 via the second layer entity 534 and the physical layer 541 of the secondary base station 500-2 to the wireless device 550.

While the second implementation has been described for a downlink data transfer, the technique is also applicable to an uplink data transfer in the dual connectivity. Particularly, the wireless device performs the duplication in its first layer entity in the step 402. The first layer entity of the master base station perform the validation in the step 304.

Figure 7:
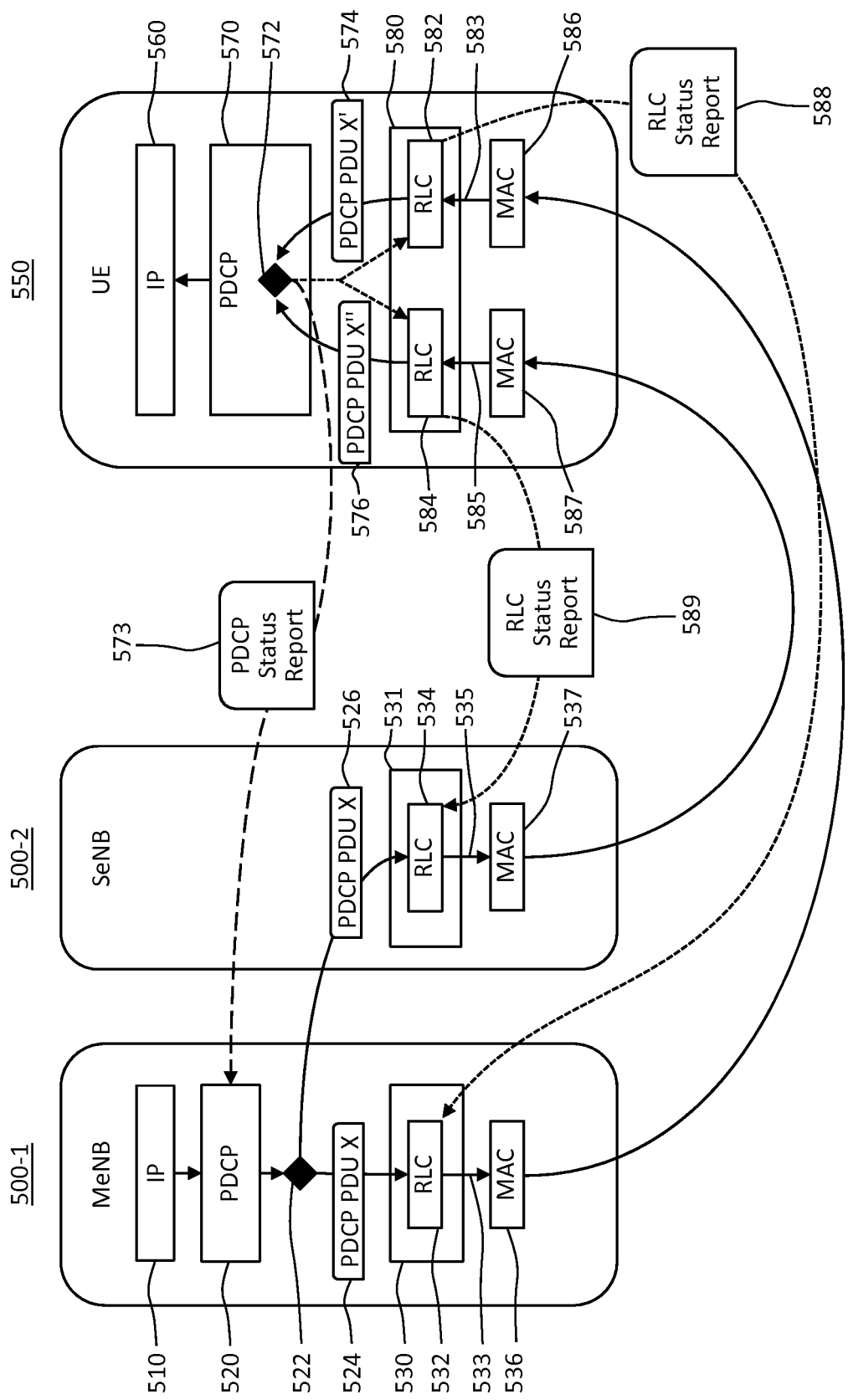
FIG. 7 shows a schematic protocol stack for a third implementation of the methods of FIGS. 3 and 4.

FIG. 7 schematically illustrates a third implementation of the methods 400 and 300 at transmitting stations 500-1, 500-2 and a receiving station 550 in the context of LTE Dual Connectivity (DC) and the PDCP split bearer architecture. Features equal or interchangeable with the first and second implementations are indicated by like reference signs. Two RLC entities 532 and 534 as well as 582 and 584 exist below one PDCP entity 520 as well as 570 at the transmitting side as well as at the receiving side.

When the UE 550 is configured with LTE DC, two independent RLC entities 532 and 534 at the eNB 500 are configured for transmission of the PDCP data 524 and 526, respectively. At the UE 550, two independent RLC entities 582 and 584 are configured for reception of the PDCP data 574 and 576. The technique couples those RLC entities 582 and 584 together and uses them for retransmission handling. The PDCP layer 570 acts thereby as a detector of events, when the PDCP PDUs 574 and 576 include data falsely accepted by the RLC layer 580 at the receiving station 550, e.g., the CRC result is positive despite at least one of the PDU X' or PDU X" being corrupted, which is determined by the validation 572. The PDCP entity 570 then issue retransmissions on the RLC layer 580.

While the third implementation in FIG. 7 is described for a download data transfer, the technique can likewise be applied for uplink transmissions. Furthermore, different network architectures are not precluded to be used for the technique. For example, the PDCP protocol may be implemented in a separate node, e.g., outside of both the Master eNB (MeNB) 500-1 and the Secondary eNB (SeNB) 500-2. Furthermore, the split bearer can be implemented within one single eNB 500, rather than involving two separate eNBs for master base station and secondary base station as described with reference to FIG. 5. For example, the second logical channel 535 may be transmitted by a Remote Radio Head (RRH).

The technique can be implemented in the context of LTE DC, e.g., according to 3GPP Release 12. LTE DC enables the UE (as an instance of the station 500 or 550) to communicate with two eNBs (i.e., the MeNB and the SeNB as a split instance of the station 550 or as a split instance of the station 500 shown in FIG. 7) at the same time. In the split bearer architecture, one of the eNBs assumes the role of the MeNB, which is the only eNB terminating the PDCP.

In the downlink data transfer, the data to be transmitted is provided at the MeNB, as an instance 500-1 of the transmitting station, by the PDCP layer 520 and transmitted directly to the UE as the receiving station 550 via an RLC entity 532 using a first logical channel 533 at the RLC layer 530 and the MAC entity 536 of the master eNB 500-1.

The data from the PDCP layer 520 is further transmitted in the step 402 using a second logical channel 535-585 by forwarding a copy 526 of the PDCP PDU 524 via a backhaul link to the secondary eNB 500-2, which transmits the data to the UE 550. 3GPP Release 13 extends the DC functionality to LTE WLAN Aggregation (LWA), wherein a WLAN node assumes the role of the SeNB 500-2.

Figure 8:
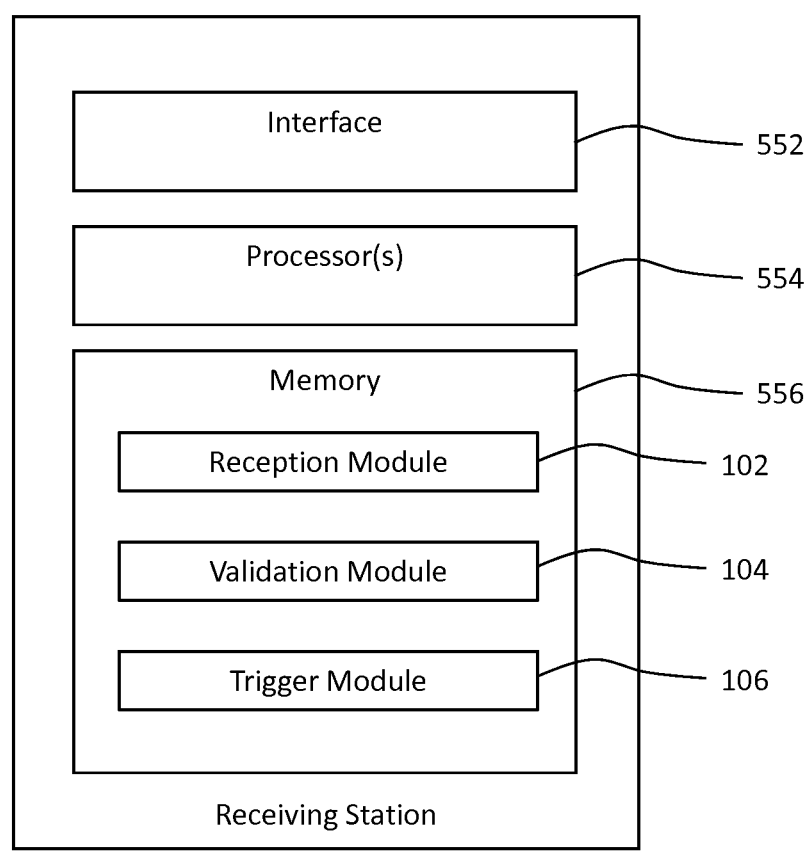
FIG. 8 shows a schematic block diagram of an embodiment of a receiving station for performing the method of FIG. 3.

FIG. 8 shows a schematic block diagram for an embodiment of a receiving station 550. The receiving station 550 comprises a radio interface 552 for radio communication with a transmitting station, one or more processor circuits 554 for performing the method 300 and memory 556 coupled to the processor circuits 554. The memory 556 is encoded with instructions that implement each of the modules 102, 104 and 106.

The one or more processor circuits 554 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 556, data reception functionality. For example, the one or more processor circuits 554 may execute instructions stored in the memory 556. Such functionality may include providing various features and steps discussed herein, including any of the benefits disclosed herein.

Figure 9:
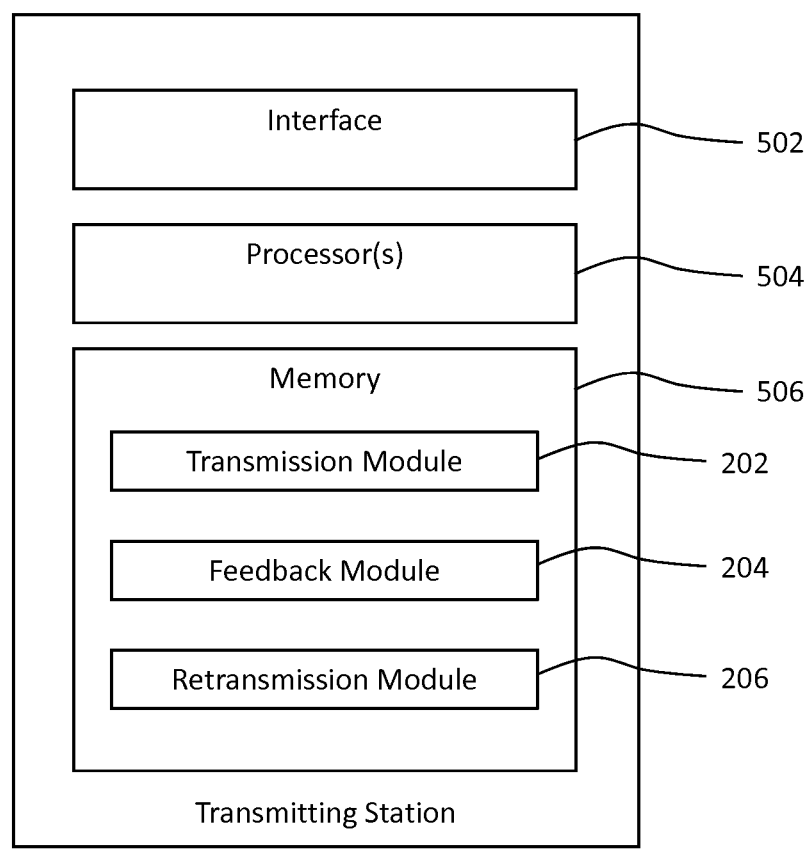
FIG. 9 shows a schematic block diagram of an embodiment of a transmitting station for performing the method of FIG. 4.

FIG. 9 shows a schematic block diagram for an embodiment of a transmitting station 500. The transmitting station 500 comprises a radio interface 502 for radio communication with a receiving station, one or more processor circuits 504 for performing the method 400 and memory 506 coupled to the processor circuits 504. The memory 506 is encoded with instructions that implement each of the modules 202, 204 and 206.

The one or more processor circuits 504 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 506, data transmitter functionality. For example, the one or more processor circuits 504 may execute instructions stored in the memory 506. Such functionality may include providing various features and steps discussed herein, including any of the benefits disclosed herein.

As has become apparent from above description of exemplary embodiments, the technique can achieve higher reliability, e.g., of an LTE system. The technique can enable deployment of LTE in CMTC use cases.

The technique can be implemented to improve reliability while at the same time latency is not necessarily increased. Embodiments are able to identify falsely as successful accepted data. The technique can be implemented on a Packet Data Convergence Protocol layer of an existing radio communication protocol.

The technique can be implemented, e.g., for 3GPP LTE, to improve reliability by lowering the residual error probability of the CRC from about $10^{-7}$ to about $(10^{-7})^2=10^{-14}$ or less. Using two coupled second layer entities, the residual error probability can be less than the squared CRC false-positive probability considering that an undetected transmission error can occur only if both PDUs received through the two second layer entities are altered in the same way on both transmission paths, and both PDUs are individually falsely accepted as successfully received by both of the second layer entities.

Embodiments can be deployed for factory automation by wirelessly connecting actuators, sensors and control systems with each other, e.g., with latency requirements in a range from some few tens of milliseconds to about 1 ms latency. Alternatively or in addition, motion of construction robots can be controlled (e.g., with few milliseconds to 0.1 ms latency. Machines can be remotely control, e.g., with 5 ms to 100 ms latency. Control or status information can be exchanged for smart energy grids, e.g., within 3 ms to 5 ms.

The technique can be implemented to fulfill latency requirements that are coupled to a reliability requirement. E.g. in some factory automation scenarios, a transmission has to be completed within 1 ms and be successful with a probability of $1-10^{-9}$.

The technique can be implemented in communication systems according to LTE and newly developed radio access, such as 3GPP NR. The technique can be implemented by enhancing the LTE PDCP layer and, optionally, the RLC layer.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following embodiments.

The invention claimed is:

1. A method of communicating data via a radio bearer including a first layer function or entity associated with a first layer of a protocol stack and at least two second layer functions or entities associated with a second layer of the protocol stack, wherein the second layer is lower than the first layer in the protocol stack, wherein the first layer includes a Packet Data Convergence Protocol (PDCP) layer, and wherein the second layer includes a Radio Link Control (RLC) layer, the method comprising:
receiving data, duplicated by a transmitting station, through each of the at least two second layer entities;
validating the data received through the at least two second layer entities, wherein the first layer entity validates the data received through the at least two second layer entities by comparing the data received through each of the second layer entities; and
selectively triggering a retransmission of the data through at least one of the second layer entities, if a result of the validation is indicative of an inconsistency in the data received through the at least two second layer entities.

2. The method of claim 1, wherein the first layer entity validates the data received through the at least two second layer entities.

3. The method of claim 1, wherein the validation requires an error detection scheme performed for the data received through each of the second layer entities.

4. The method of claim 3, wherein an acknowledgment (ACK) is sent for the received data, if a result of the error detection scheme is indicative of no error for the data received through each of the second layer entities and if the result of the validation is indicative of consistency of the received data.

5. The method of claim 1, wherein at least two of the second layer entities receive the data in a dual connectivity or multi connectivity.

6. The method of claim 1, wherein the first layer entity triggers the retransmission by sending a negative acknowledgment (NACK) for the received data in a status report.

7. The method of claim 1, wherein the first layer entity informs the at least one of the second layer entities as to the result of the validation.

8. The method of claim 1, wherein the at least one second layer entity triggers the retransmission by sending a negative acknowledgment (NACK) for the received data in a status report.

9. The method of claim 1, wherein the second layer entities refrain from sending an acknowledgment (ACK) for the respectively received data until the result of the validation is indicative of consistency of the received data.

10. The method of claim 1, wherein the second layer entities send a feedback indicative of an outstanding validation of the respectively received data before the result of the validation is indicative of consistency of the received data.

11. A method of communicating data via a radio bearer that includes a first layer function entity associated with a first layer of a protocol stack and at least two second layer functions or entities associated with a second layer of the protocol stack, wherein the second layer is lower than the first layer in the protocol stack, wherein the first layer includes a Packet Data Convergence Protocol (PDCP) layer, and wherein the second layer includes a Radio Link Control (RLC) layer, the method comprising:
transmitting data, duplicated by a transmitting station, through each of the at least two second layer entities;
receiving a feedback indicative of a result of validating the data transmitted through the at least two second layer entities, wherein the feedback is indicative of a result of comparing the data received through each of the second layer entities; and
selectively retransmitting the data through at least one of the second layer entities, if the result of the validation is indicative of an inconsistency for the data transmitted through the at least two second layer entities.

12. The method of claim 11, wherein the first layer entity duplicates a packet data unit (PDU) including the data to be transmitted and provides one of the PDUs to each of the at least two second layer entities for the transmission.

13. The method of claim 11, wherein at least two of the second layer entities transmit the data in a dual connectivity or multi connectivity.

14. The method of claim 11, wherein the first layer entity triggers the retransmission in response to receiving a negative acknowledgment (NACK) for the transmitted data in a status report as the feedback.

15. The method of claim 11, wherein the first layer entity informs at least one of the second layer entities as to the result of the validation.

16. The method of claim 11, wherein the at least one second layer entity triggers the retransmission in response to receiving a negative acknowledgment (NACK) for the received data in a status report as the feedback.

17. The method of claim 11, wherein the second layer entities receive a feedback indicative of an outstanding validation of the respectively transmitted data before receiving the feedback indicative of the result of the validation.

18. A device for communicating data via a radio bearer that includes a first layer function or entity associated with a first layer of a protocol stack and at least two second layer functions or entities associated with a second layer of the protocol stack, wherein the second layer is lower than the first layer in the protocol stack, wherein the first layer includes a Packet Data Convergence Protocol (PDCP) layer, and wherein the second layer includes a Radio Link Control (RLC) layer, the device comprising:
processing circuitry; and
memory containing instructions executable by the processing circuitry whereby the device is operative to:
receive data, duplicated by a transmitting station, through each of the at least two second layer entities;
validate the data received through the at least two second layer entities, wherein the first layer entity validates the data received through the at least two second layer entities by comparing the data received through each of the second layer entities; and
selectively trigger a retransmission of the data through at least one of the second layer entities, if a result of the validation is indicative of an inconsistency in the data received through the at least two second layer entities.

19. A device for communicating data via a radio bearer that includes a first layer function or entity associated with a first layer of a protocol stack and at least two second layer functions or entities associated with a second layer of the protocol stack, wherein the second layer is lower than the first layer in the protocol stack, wherein the first layer includes a Packet Data Convergence Protocol (PDCP) layer, and wherein the second layer includes a Radio Link Control (RLC) layer, the device comprising:
processing circuitry; and
memory containing instructions executable by the processing circuitry whereby the device is operative to:

transmit data, duplicated by a transmitting station, through each of the at least two second layer entities;

receive a feedback indicative of a result of validating the data transmitted through the at least two second layer entities, wherein the feedback is indicative of a result of comparing the data received through each of the second layer entities; and selectively retransmit the data through at least one of the second layer entities, if the result of the validation is indicative of an inconsistency for the data transmitted through the at least two second layer entities.

\* \* \* \* \*